US012531068B2

(12) United States Patent
Sridhar

(10) Patent No.: US 12,531,068 B2
(45) Date of Patent: Jan. 20, 2026

(54) PROCEDURAL PATTERN MATCHING IN AUDIO AND AUDIOVISUAL FILES USING VOICE PRINTS

(71) Applicant: PAYPAL, INC., San Jose, CA (US)

(72) Inventor: Vaidehi Sridhar, Vellore (IN)

(73) Assignee: PAYPAL, INC., San Jose, CA (US)

( * ) Notice: Subject to any disclaimer, the term of this patent is extended or adjusted under 35 U.S.C. 154(b) by 310 days.

(21) Appl. No.: 18/325,879

(22) Filed: May 30, 2023

(65) Prior Publication Data

US 2024/0404527 A1   Dec. 5, 2024

(51) Int. Cl.
*G10L 17/04*   (2013.01)
*G10L 17/02*   (2013.01)
*G10L 17/06*   (2013.01)

(52) U.S. Cl.
CPC .............. *G10L 17/04* (2013.01); *G10L 17/02* (2013.01); *G10L 17/06* (2013.01)

(58) Field of Classification Search
CPC .......... G10L 17/04; G10L 17/06; G10L 17/22
See application file for complete search history.

(56) References Cited

U.S. PATENT DOCUMENTS

| | | | | |
|---|---|---|---|---|
| 9,300,801 | B1 * | 3/2016 | Warford ................... | G10L 25/63 |
| 11,004,454 | B1 * | 5/2021 | Srinivasan ............... | G10L 17/04 |
| 11,869,510 | B1 * | 1/2024 | Greene ..................... | G06N 7/01 |
| 11,979,398 | B2 * | 5/2024 | Zhang ...................... | G06F 21/32 |

| | | | | |
|---|---|---|---|---|
| 2003/0009333 | A1 * | 1/2003 | Sharma .................... | G10L 17/10 |
| | | | | 704/E15.005 |
| 2003/0130893 | A1 * | 7/2003 | Farmer .............. | G06Q 30/0266 |
| | | | | 705/14.63 |
| 2007/0052517 | A1 * | 3/2007 | Bishop ................. | G06Q 20/385 |
| | | | | 340/5.2 |
| 2009/0043573 | A1 * | 2/2009 | Weinberg ................ | G10L 17/06 |
| | | | | 704/223 |
| 2009/0225970 | A1 * | 9/2009 | Grigsby ................. | H04R 27/00 |
| | | | | 379/202.01 |
| 2011/0051907 | A1 * | 3/2011 | Jaiswal ................... | G10L 17/22 |
| | | | | 379/88.04 |
| 2014/0337949 | A1 * | 11/2014 | Hoyos ................. | H04L 63/0853 |
| | | | | 726/7 |

(Continued)

FOREIGN PATENT DOCUMENTS

WO    WO-2021152566 A1 *  8/2021  ........... G10L 21/003

*Primary Examiner* — Shaun Roberts
(74) *Attorney, Agent, or Firm* — Haynes and Boone, LLP

(57) ABSTRACT

There are provided systems and methods for procedural pattern matching in audio and audiovisual files using voice prints. A user may utilize a computing device to interact with online service providers via voice communications. Based on audio and/or audiovisual data provided during the voice communications, voice prints may be generated, such as by determine audio signals from audio and/or audiovisual data, extracting audio features from such signals, and identifying voice and other audio dimensions in the audio and/or audiovisual data. The voice print may be generated based on an algorithmic calculation or other function that hides or obscures personal data for the corresponding user and/or masks the users voice and identity. The voice print may then be stored and used as a key for data associated with the user, which allows the data to be scrubbed or masked of the user's personal data to protect their privacy.

20 Claims, 7 Drawing Sheets

(56) References Cited

U.S. PATENT DOCUMENTS

| | | | | |
|---|---|---|---|---|
| 2016/0112204 | A1* | 4/2016 | Cipli | H04L 9/3247 |
| | | | | 713/176 |
| 2017/0359334 | A1* | 12/2017 | Maddox | G10L 17/24 |
| 2021/0075787 | A1* | 3/2021 | Zhang | H04L 63/0861 |
| 2021/0160242 | A1* | 5/2021 | McKnight | H04L 63/102 |
| 2022/0148339 | A1* | 5/2022 | Casado | G06V 40/161 |
| 2022/0165262 | A1* | 5/2022 | Sumpter | G06Q 10/0631 |
| 2022/0375477 | A1* | 11/2022 | Tan | G10L 17/06 |

* cited by examiner

PROCEDURAL PATTERN MATCHING IN AUDIO AND AUDIOVISUAL FILES USING VOICE PRINTS

TECHNICAL FIELD

The present application generally relates to voice detection and voice print analysis of users, and more particularly to voice prints generated for procedural pattern matching and privacy protection.

BACKGROUND

Various types of service providers may provide services to entities using voice communication systems, such as live agent phone and/or video calls, interactive voice response (IVR) systems, and the like. For example, a service provider may provide a call-in service to users that allows the users to interact with the service provider through a phone call or other voice data transfer medium, such as voice over IP or LTE (VOIP or VOLTE) or other data transfer that allows audio or audiovisual content to be transferred between two or more endpoints. During use of a voice communication system with a service provider's endpoint, such as during an audio or audiovisual communication call or session, the user or a live agent may want to find past communications and information for the user from other audio and/or audiovisual files. This data may be used to provide more targeted assistance and/or bypass repetitive discussions and data entry. Users may also be required to authenticate an identity of the user or otherwise validate their information. For example, a user may have an online account with the service provider and store sensitive information (e.g., personal and/or financial information) with the accounts and platforms. If another user gains access to this account, then the user risks exposure of this sensitive information and may lead to theft and abuse of this information.

However, the processes to search and locate previous communications and discussions from users, as well as authenticate during an audio communication session, are time consuming. For example, audio files are large and conventionally stored in segments, making grouping difficult and tracing or searching time consuming. Further, retention of customer voice data may correspond to storage of personal data, which requires protection and/or masking based on laws, regulations, and/or company mandates. Thus, conventional voice communication systems are slow and may risk compromising a user's identity, account, and/or sensitive information. As such, it is desirable to provide secure systems and methods for voice and other audio data storage while allowing for more efficient data storage and faster searching.

Figure 1:
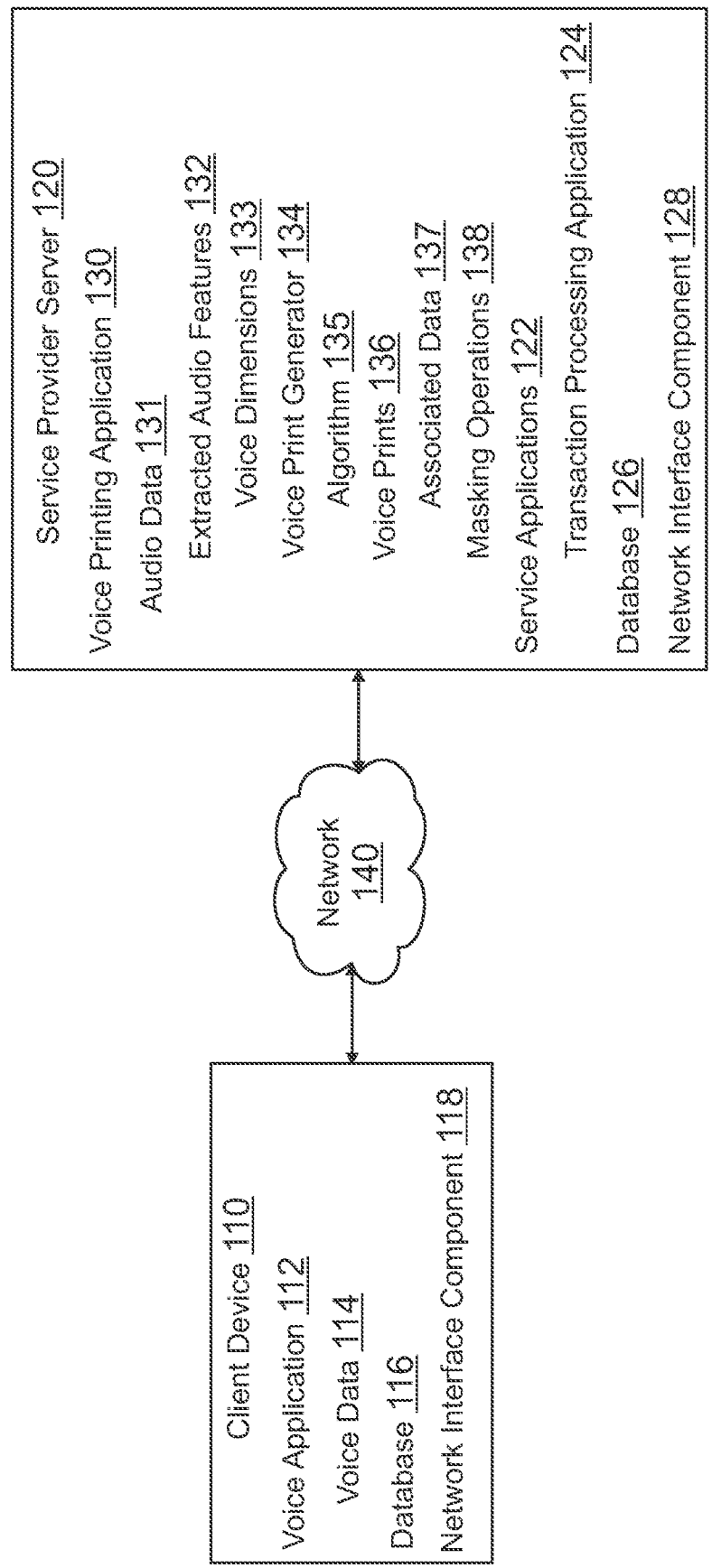
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for procedural pattern matching in audio and audiovisual files using voice prints. Systems suitable for practicing methods of the present disclosure are also provided.

An online service provider, such as an online platform providing one or more services to users and groups of users, may provide a platform that allows a user to access and/or interact with the service provider, live agents of the service provider, chatbots or interactive voice response (IVR) systems, and/or other audio and audiovisual endpoints through voice and/or video communications, calls, and sessions. The service provider may allow the user to register an account and/or utilize computing services through various platforms, communications, applications, websites, and/or devices, such as to perform electronic transaction processing and/or otherwise utilize an account for transaction, payment, transfer, data access, and other services. However, during use of the voice and/or video communications and channels (e.g., audio and audiovisual data transfers and corresponding recordings and files of such transfers), the user and/or an agent or other service assisting the user may require identification of user information, account details, past communications and sessions including corresponding data files and contents, authentication, and the like. Thus, the service provider may provide a computing service and backend to generate voice prints and/or other fingerprints of voice and other audio signals of the user. Such voice prints may be used to securely protect private and/or personal information of the user, reduce data storage required by larger audio and audiovisual files, and provide faster voice and audio data searching, grouping, and retrieval during communication sessions.

In this regard, the service provider may access a data file including audio and/or audiovisual data from a communication session, call, or other communication via a communication channel, which may include voice waves and other data of the user, other users including background users and/or other participants to the session, and/or audio waves and data of other noise. The service provider may also receive the data in real-time or near real-time during an active or recent communication session. To generate voice prints from such data and files, the service provider may implement and execute a voice print generator and/or other application, operations, and the like, which may utilize a mathematical algorithm and operations for calculating and determining voice prints from noise and audio wave dimensions and other audio features from the audio data. After generating a voice print, the voice print may be stored and associated with the user and/or an account of the user with the service provider or another external or third-party entity. Further, the underlying or base audio file may not be required to be stored or no longer stored (e.g., if accessed after storage for voice printing), and may be scrubbed, masked, and/or deleted. When scrubbing or masking, personal information, including voice data of the user may be masked, altered, obfuscated, removed, or otherwise changed to protect personal privacy and personally identifiable information (PII) standards and requirements. This may also include enforcement of laws and regulations for data privacy. Thereafter, the voice print may later be used to search and correlate to different audio and/or audiovisual files and communications when received and/or stored for searching, data retrieval, authentication, and/or other computing services that may be provided to users during voice communication sessions and calls.

In order to provide these services, an online service provider (e.g., an online transaction processor, such as PAYPAL®) may provide account services to users of the online service provider, as well as other entities requesting additional services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services including providing compensation to others for use of their devices with the contact lookup operations of the service provider. In some embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services. However, other service providers may also provide the computing services discussed herein, such as telecommunication service providers.

Once the account of the user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. The interactions may also include help or assistance sessions and the like. For such interactions, voice communications may be used via audio and/or audiovisual communication calls, sessions, and/or channels. The user may then engage in voice discussions and interactions that provide audio and/or audiovisual data to the service provider. Live agents, bots, IVR systems, and the like, may also be used to interact back with the user during the communication session via the corresponding communication channel.

When a user connects and interacts with a service provider via a communication channel that includes voice communications and voice data transfers, audio and/or audiovisual data may be generated and/or recorded of the user, the user's background audio or noises, and/or one or more participants and their voices or other noises that the user interacts with via the channel. For example, the user may utilize a help assistance hotline, an IVR system, a video chat channel, or the like to communicate with the service provider. The voice communication system may also allow the user to enter data via typing on a phone keypad and/or through voice inputs. Other communication channels that the user may utilize include a mobile application on the user's device, as well as a similar rich Internet application and/or website on the other user's device. This audio and audiovisual data, data streams, and/or storable data files may be semi-structured or unstructured in that initially the data may not be grouped and/or clearly associated with particular data parameters and/or metadata. However, the data includes personal data in that the customer or other user's voice is present (as well as any personal user information provided in voice communications) in the data and the service provider may desire, or be required, to mask, hide, obfuscate, scrub, or delete such personal data. Further, the audio and/or video data may be large data files and consume a large amount of storage, may be stored in segmented, and/or not have a common storage pool, which may make data searching, retrieval, and tracing difficult.

Thus, the service provider may perform groupings of audio and/or audiovisual (e.g., video communications) data based on audio features from voice and other audible dimensions in the audio and/or audiovisual data. This may allow for procedural pattern matching through voice prints generated from the audio features extracted from the data. The voice prints may be captured from the aforementioned communication channels and user interactions for voice communications, and audio features may be extracted. For example, a voice print generator, which may correspond to a computing service, application, and/or executable operations, may access or receive the audio or audiovisual data for analysis and implement operations to extract the audio features for consideration and use in generating a voice print.

In this regard, the voice print generator may utilize a voice tone, user emotions or emotive statements and noises, decibel levels and decibel changes, word speed, word or conversation pauses (including length, occurrence, etc.), and the like. Background noise may be included or removed, where removal may include filtering audio waves considered to be background noises based on rules and/or machine learning (ML) models for background noise prediction. Each feature or other detail may be extracted as an audio wave and/or corresponding mathematical representation of such wave, such as a vector of n-dimensions and/or value for such dimensions. Features may be extracted using a data extraction operation for such features, which may be based on analysis of audio signals and waves within the underling audio or audiovisual file. During extraction, the operations may use algorithms with audio signals for determination of the audio features and/or ML models and engines to extract and identify such features.

The voice print generator may operate by calculating a voice print using the input audio features from the audio signals of the user's voice, voice and noise communications during a call or other audio/audiovisual session, and/or other audible noises during the session. In this regard, a voice print may be determined and/or calculated using an algorithm or formula that may weigh and compute values for each of the audio features that indicate contributions to the voice print. The voice print generator may then utilize such values or determinations when generating a voice print. The voice print may be output as a block in a key form (e.g., table shorting a set of values and/or hashes of values), vector, numerical representative of a mathematical determination, or the like. In some embodiments, such a voice print generator may utilize computing rules and a rule-based engine when calculating weights and keys for tables from a formula or other technique. However, the voice print generator may also or instead use one or more ML models with an ML engine that has input features corresponding to extracted data for the audio features, which provides an output encoding, vector, or fingerprint of the user's voice and/or audio.

Once the voice print is generated, the voice print may be stored in association with data for the user, such as a user or account identifier, account data, past interactions and communications, and/or other audio and/or audiovisual files. Storage of the voice print may allow for recorded and/or stored audio data of the user that includes the users voice to be masked and/or scrubbed of such data, as well as deleted or moved to a secure storage, in order to protect the user's privacy. The voice print may also be used for filtering and/or searching of other audio and/or audiovisual files and data (including real-time data and/or streaming data) by generating other voice prints of such data and comparing to the stored data. This may allow for authentication and/or verification of an identity of a user. Further, this may provide benefits over conventional audio detection, searching, and/or authentication by not matching audio waves and/or signals but instead creating a voice print of other data fingerprint that is unique and does not have personal or private information of the user including the user's voice.

Thus, older stored voice data may be masked and/or scrubbed of identifications of the user after voice printing. New incoming data may then be automatically voice printed as well and matched or correlated to existing stored voice prints using a comparison operation (e.g., vector comparison of dimensions, table comparisons, etc.), distance calculations between vectors or other mathematical representatives, clustering, and/or ML models. Such searching and comparing may be done securely and while protecting users' privacy while also allowing for more efficient and faster searching and data processing through stored voice prints instead of large audio files. Thus, the service provider may democratize storage and allow audio and video files to be store in decentralized storage formats, like NoSQL databases, while allowing for searching and tracing of recordings based on the voice print, thereby reducing storage requirements and costs. This may also reduce the time needed to search for audio and/or audiovisual data while addressing issues of users during further voice communications. A live or automated agent may be able to segregate and filter older conversations and voice communications in order to find and/or search for audio and/or audiovisual files and communications. Further, by using voice prints, personal data may be more easily and securely stored by not requiring storage and/or identification of user personal data (e.g., voice data, removing agent conversation in personal data contexts, and/or filtering and searching by user voice prints instead of voice data), thereby applying data protection policies. Thus, the voice print system, encoder, and/or generator provides an improved system that reduces data storage requirements and costs while improving data security and data protections and privacy.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110 and a service provider server 120 in communication over a network 140. Client device 110 may be used to interact with service provider server 120 using voice prints for audio filtering and tracing, as well as authentication and/or identity verification.

Client device 110 may initiate a voice communication, which may also include video or images, with service provider server 120 and/or an endpoint associated with service provider server 120. Service provider server 120 may process voice data from the communications, such as a voice of a user from an audio file, streamed as audio signals, and/or extracted from a past stored audio file, and determine different audio features of the user's voice for a voice print associated with the user and/or client device 110.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented using any appropriate hardware and software configured for wired and/or wireless communication with service provider server 120 and/or voice communication endpoints, phone or video conferencing services, and the like. For example, client device 110 may be utilized with services for audio and audiovisual communications and data exchanged. Client device 110 may correspond to an individual user, consumer, or merchant that utilizes a network and platform provided by service provider server 120 to access and use computing services, which may include electronic transaction processing services. In various embodiments, client device 110 may be implemented as a personal computer (PC), a smart phone, laptop/tablet computer, wristwatch with appropriate computer hardware resources, other type of wearable computing device, and/or another type of computing device capable of transmitting and/or receiving data. Although one computing devices is shown, a plurality of computing device may function similarly.

Client device 110 of FIG. 1 contains a voice application 112, a database 116, and a network interface component 118. Voice application 112 may correspond to executable processes, procedures, and/or a software application with associated hardware. In other embodiments, client device 110 may include additional or different software as required.

Voice application 112 may correspond to one or more processes to execute modules and associated components of client device 110 to provide a convenient interface to permit users for client device 110 to engage in voice and/or video communications with other users and/or endpoints (including automated endpoints, such as IVR systems, automated bots and callers, etc.), as well as enter, view, and/or process data for electronic transaction processing. In this regard, voice application 112 may correspond to specialized hardware and/or software utilized by client device 110 that may provide access to voice and/or video communication services, including phone call and traditional PSTN (Public Switched Telephone Network) services, VOIP, VOLTE, online video conference (e.g., WEBEX®, ZOOM®, MICROSOFT TEAMS®, etc.), and the like. Access and use of services may be provided through a user interface enabling the corresponding user to access communication channels, incoming/outgoing communication requests, and other communication services and engage in communications with other users and endpoints. The user interface may further be used to request data processing and/or other services provided by service provider server 120. In various embodiments, voice application 112 may correspond to a general browser application configured to retrieve, present, and communicate information over the Internet (e.g., utilize resources on the World Wide Web) or a private network. For example, voice application 112 may provide a web browser, which may send and receive information over network 140, including retrieving website information, presenting the website information to the user, and/or communicating information to the website, including payment information for the transaction.

In other embodiments, voice application 112 may include a dedicated software application that resides on client device 110 which may be configured to assist in voice communications, such as a mobile application on a mobile device. Accordingly, voice application 112 may provide a window, interface, or other application field/element that allows for initiating and conducting voice and/or video communications, which may include audio data of at least the user of client device 110, as well as other users, automated or interactive voice bots or systems, and the like. The content may be audiovisual content and may include video, an image, or other representation of another user (e.g., icon and/or identifier), as well as output audio of those users. Voice application 112 may include a user interface and/or window for an application or web browser in a graphical user interface (GUI) of client device 110. A video conference may include multiple cells for different participating users in the video conference and may also display names and/or identifiers (e.g., phone numbers, email addresses, account or login names or identifiers, etc.) for the users. The video conference may further be displayed with a chat window or the like. During the communication session, voice data 114 may be provided, which may be recorded and saved in an audio and/or audiovisual file, streamed for voice print generation and/or processing, and the like.

During the phone call, voice communication, video chat or conference, payments and transactions may be processed. A voice print may be generated for the user utilizing client device 110 during voice data 114 from the voice communications and/or in a prior communication session by service provider server 120. Voice data 114 may be converted to the voice print using the operations discussed in reference to service provider server 120, as further detailed in FIGS. 2A-4 below. The voice print may be used for retrieval of other past data stored with and/or in association with the voice print, such as past communication and/or interaction data. Such data may arise from past help or assistance sessions, transaction processing or subsequent transaction review (e.g., for approval, fraud, risk assessment, etc.), and the like. The voice print may also be used for user authentication and further provision of computing services, data, and the like to the user using client device 110. Thus, voice application 112 may be used for one or more data processing tasks, such as electronic transaction processing, help or assistance, past voice communication and interaction data retrieval, and the like, using the voice print.

Voice application 112 may be utilized to enter, view, and/or process items the user wishes to purchase in a transaction, as well as perform peer-to-peer payments and transfers. In this regard, voice application 112 may provide transaction processing through a user interface enabling the user to enter and/or view the items that the user associated with client device 110 wish to purchase. Voice application 112 may also be used by a user to provide payments and transfers to another user or merchant. For example, accounts and electronic transaction processing may include and/or utilize user financial information, such as credit card data, bank account data, or other funding source data, as a payment instrument when providing payment information to service provider server 120 for the transaction. Additionally, voice application 112 may utilize a digital wallet associated with an account with a payment provider as the payment instrument, for example, through accessing a digital wallet or account of a user through entry of authentication credentials and/or by providing a data token that allows for processing using the account. Voice application 112 may also be used to receive a receipt or other information based on transaction processing. Further, additional services may be provided via voice application 112, including social networking, media posting or sharing, microblogging, data browsing and searching, online shopping, and other services available through service provider server 120.

Client device 110 may further include database 116 which may include, for example, identifiers such as operating system registry entries, cookies associated with voice application 112 and/or other applications, identifiers associated with hardware of client device 110, or other appropriate identifiers. Identifiers in database 116 may be used by a payment/service provider to associate client device 110 with a particular account maintained by the payment/service provider, such as service provider server 120. Database 116 may also further store additional data provided during voice and/or video communication sessions, such as images or user identification information, which may further be used with the voice print for additional voice print security and unique identification of the user utilizing client device 110 when voice data 114 is provided.

Client device 110 includes network interface component 118 adapted to communicate with service provider server 120 and/or other devices, servers, endpoints, and the like over network 140. In various embodiments, network interface component 118 may include a DSL (e.g., Digital Subscriber Line) modem, a PSTN modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for voice print generation using audio and/or audiovisual data of users from voice communications. Service provider server 120 may further provide additional computing services, such as electronic transaction processing services. Various embodiments of the voice communications and electronic transaction processing system described herein may be provided by service provider server 120 and may be accessible by client device 110 when accessing a website or application provided by service provider server 120. In such embodiments, service provider server 120 may interface with client device 110 to provide digital communication, voice printing, and/or electronic transaction processing services in conjunction with service applications 122. Service provider server 120 includes one or more processing applications which may be configured to interact with client device 110 and/or other devices or servers for computing service provision. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a voice printing application 130, service applications 122, a database 126, and a network interface component 128. Voice printing application 130 and service applications 122 may correspond to executable processes, procedures, and/or applications with associated hardware. In other embodiments, service provider server 120 may include additional or different modules having specialized hardware and/or software as required.

Voice printing application 130 may correspond to one or more processes to execute modules and associated specialized hardware of service provider server 120 to process an audio data file, audio data stream, or other content having audio data 131 (which may include audiovisual content) in order to generate voice prints from audio features detected in the audio data. Such voice prints may be generated based on a voice of a user and may correspond to a combined or calculated value, vector, digital fingerprint, or other mathematical representation of audio features from extracted audio signals of the user's voice in the audio data. Thus, in some embodiments, voice printing application 130 may correspond to specialized hardware and/or software used by service provider server 120 to unique identify users using voice prints, which may be used for various identification, authentication, and/or data storage and retrieval (e.g., database querying or searching) operations with service applications 122 and/or database 126.

In this regard, voice printing application 130 may parse and determine or extract data from audio data 131, such as extracted audio features 132. Extracted audio features 132 may be determined and extracted from audio data 131 by isolating, determining, and/or identifying audio signals corresponding to a specific user's voice and/or for all users' voices and correlating the signals for the specific user. Voice dimensions 133 may then be determined from audio features 132, such as at least a voice tone, a user emotion, a loudness or decibel level of the speech or voice, a word speed, and/or word pauses, and background noise may be filtered out, removed, or masked. Voice printing application 130 may then execute a voice print generator 134 that includes operations to perform algorithmic or formulaic calculations and determinations using algorithm 135 (e.g., a mathematical formula or model) for voice print calculation and generation. Algorithm 135 may be implemented by voice print generator 134 using computing code and language to execute an algorithmic operation for voice print determination. Further, voice print generator 134 and algorithm 135 may be configured to eliminate, hide, obfuscate, delete, or otherwise remove identifying and/or personal information of the user during or after voice print generation, such as by calculating a value representation or combined value for each of voice dimensions 133 from extracted audio features 132 (e.g., an average of an audio wave or signal).

Voice print generator 134 may utilize one or more machine learning (ML) models, neural networks (NNs), and/or other artificial intelligence (AI)-driven engines when implementing and executing algorithm 135. For example, when initially configuring ML models or NN algorithms, data may be used to determine input features and utilize those features to generate decision trees, clustering, vectorization, similarity score calculation, or other decision-making architectures based on the input features. ML models may include one or more layers, including an input layer, branches or hidden layers, and an output layer having one or more nodes; however, different layers may also be utilized. As many branches or hidden layers as necessary or appropriate may be utilized. Each node within a branch or layer is connected to a node within an adjacent layer, where a set of input values may be used to generate one or more output values or classifications. Within the input layer, each node may correspond to a distinct attribute or input data type that is used for the ML model algorithms using feature or attribute extraction for input data.

Thereafter, the branches or hidden layers may be generated with these attributes and corresponding weights using an ML algorithm, computation, and/or technique. For example, each of the nodes in the branches or hidden layers generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the nodes may be used by the output layer node to produce one or more output values for the ML models that provide an output, classification, prediction, or the like. Thus, when the ML models are used to perform a predictive analysis and output, the input may provide a corresponding output based on the classifications trained for the ML models. By providing input data when generating the ML model algorithms, the nodes in the branches or hidden layers may be adjusted such that an optimal output (e.g., a classification within a desired accuracy threshold) is produced in the output layer. By continuously providing different sets of data and penalizing ML models when the output of ML models is incorrect, the ML model algorithms (and specifically, the representations of the nodes) may be adjusted to improve its performance in data classification.

Thereafter, based on the audio content having the voice of the user, one of voice prints 136 may be generated for that user that uniquely identifies the voice of the user with service provider system 120. Voice prints 136, such as the voice print of the user from audio data 131, may then have associated data 137 that is stored with its corresponding voice print so that the data may be retrieved and/or used when the voice print is again detected by service provider server 120. Associated data 137 may correspond to audio data 131 scrubbed or having masked/removed of the voice of the user using masking operations 138. Masking operations 138 may be used to hide or secure the personal information and privacy of the user while retaining and storing audio data 131 with sufficient content to desired purposes, such as identification or authentication. The corresponding one of voice prints 136 may allow for retrieval of audio data 131 at a later time for use. Further, voice prints 136 may be used for additional operations including authentication or other user identification processes. The voice printing operations may be repeated and/or further performed for additional users in the voice call and/or with other audio data, such as for multiple users (e.g., the customers of service provider server 120). Thus, voice prints 136 may be determined for many users in order to uniquely identify all such users using the voice print calculation and generation operations described herein. Further, voice prints may be updated as additional voice and other audio or audiovisual data for users is received over time. For example, users' voices may change over time, and their voice prints may be correspondingly updated to reflect such changes by calculating new voice prints over time and replacing, updating (e.g., averaging, weighting, etc.), or otherwise changing past voice prints of the user. The operations and features of voice printing application 130 for voice print generation and usage are described in further detail with regard to FIGS. 2A-4 below.

Service applications 122 may correspond to one or more processes to execute modules and associated specialized hardware of service provider server 120 to provide voice data communications, process a transaction, and/or provide another service to end users of service provider server 120, which may utilize voice prints for data storage and retrieval, authentication, and other identification processes for users based on unique identification through such voice prints. In some embodiments, service applications 122 may correspond to specialized hardware and/or software used by a user associated with client device 110 to provide payment and transaction processing services through a transaction processing application 124, including establishing a payment account and/or digital wallet used to process transactions. In various embodiments, financial information may be stored to the account, such as account/card numbers and information. A digital token for the account/wallet may be used to send and process payments, for example, through an interface provided by transaction processing application 124. When signing up for accounts and onboarding users, links and/or processes to perform these actions may be provided to client device 110.

The payment account may be accessed and/or used through a browser application and/or dedicated payment application executed by client device 110 and engage in transaction processing through transaction processing application 124. Transaction processing application 124 may process the payment and may provide a transaction history to client device 110 for transaction authorization, approval, or denial. In further embodiments, service applications 122 may provide or utilize voice and/or video communication services for audio and audiovisual data and content exchange and transmission. For example, one or more of service applications 122 may interface with application programming interfaces (APIs) of phone call and communication services, (e.g., PSTN, VOIP, VOLTE, Internet voice and/or video communication platforms, etc.), video chat and conferencing services, and the like through additional APIs and API calls.

For example, service applications 122 may include and/or utilize an internal and/or external communication platform, channels, server, and/or device that provide audio and/or audiovisual communication services to users. Service applications 122 may provide video telephony or video teleconference services, such as for the transmission and reception of audiovisual signals and content of users in real-time or near real-time between users. Service applications 122 may include one or more APIs exposed to and integrated with service provider server 120 for audio communication exchange and provision, such as with APIs of voice printing application 130. Voice communications may be provided of PSTNs, the Internet, or other networks via mobile devices, websites and web browsers accessing webpages chat webpages, dedicated software applications including mobile applications, and the like. In this regard, service applications 122 may provide additional content and services to client device 110, service provider server 120, and/or other devices or servers interacting with client device 110 during a communication session, such as media content, audiovisual content, chat features and data, transaction processing options, user identifiers and/or usernames, and the like.

In various embodiments, service provider server 120 includes service applications 122 as may be desired in particular embodiments to provide features to service provider server 120. For example, service applications 122 may include security applications for implementing server-side security features, programmatic client applications for interfacing with appropriate APIs over network 140, or other types of applications. Service applications 122 may contain software programs, executable by a processor, including one or more GUIs and the like, configured to provide an interface to the user when accessing service provider server 120, where the user or other users may interact with the GUI to view and communicate information more easily. In various embodiments, service applications 122 may include additional connection and/or communication applications, which may be utilized to communicate information to over network 140 that may be utilized for voice print generation and/or usage.

Additionally, service provider server 120 includes database 126. Database 126 may store various identifiers associated with client device 110. Database 126 may also store account data, including payment instruments and authentication credentials, as well as transaction processing histories and data for processed transactions including those processed by users and associated with voice prints for later data search and retrieval. Database 126 may store received audio data and audio data files, which may be processed for voice print calculation, generation, and/or user. In this regard, calculated or generated voice prints may also be stored to database 126, and may be associated or linked to certain data for storage so that the linked data may be retrieved when that voice print is queried or used to search database 126. For example, past help or assistance sessions, requests, or queries from prior phone calls or audio/video chats may be stored in association with voice prints, as well as authentication data and other identification data.

In various embodiments, service provider server 120 includes at least one network interface component 128 adapted to communicate with client device 110 and/or another device/server over network 140. In various embodiments, network interface component 128 may comprise a DSL (e.g., Digital Subscriber Line) modem, a PSTN modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
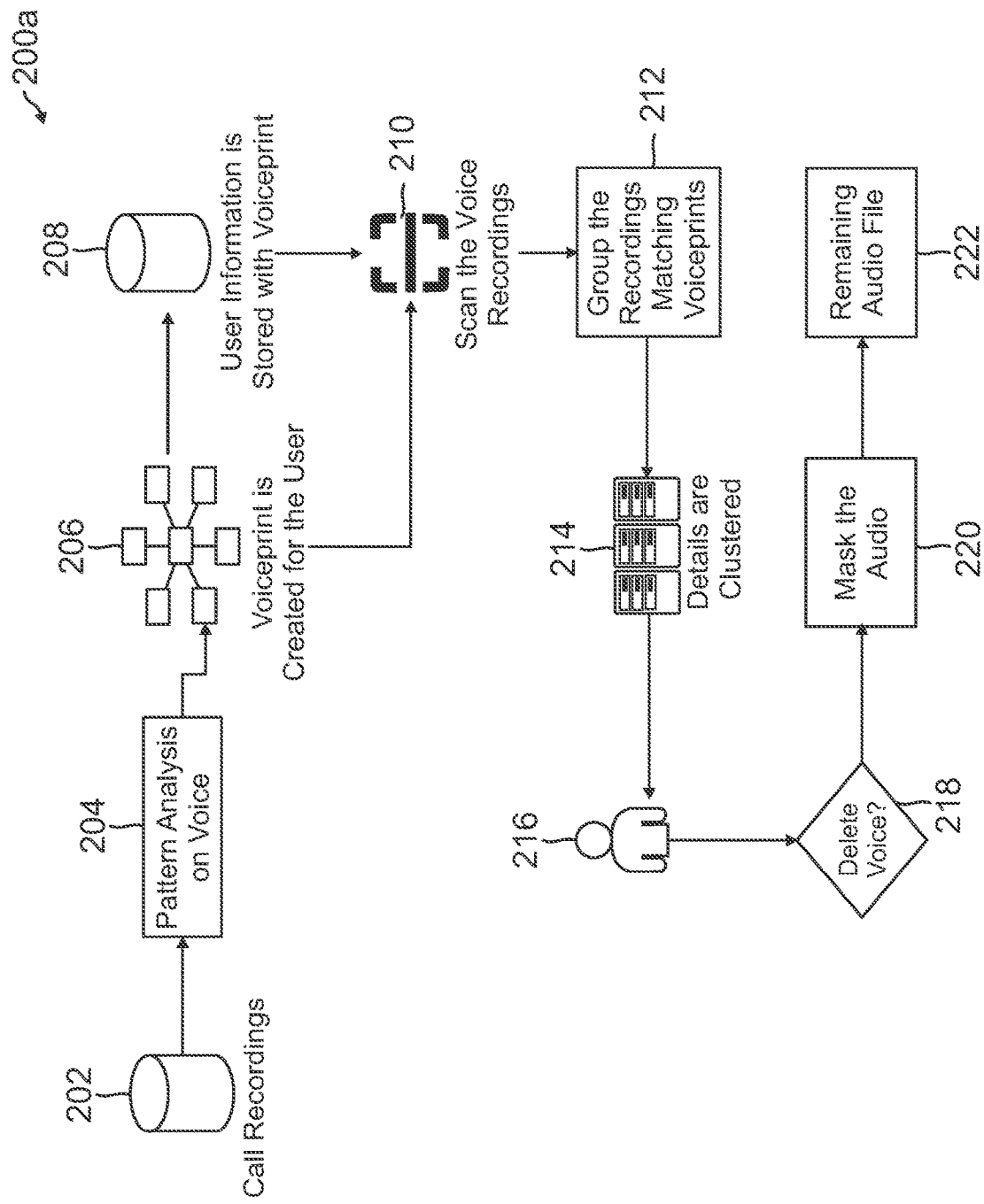
FIGS. 2A-2C are exemplary system architectures of service provider components used to generate voice prints and perform procedural pattern matching in audio and audiovisual files using such voice prints, according to an embodiment.
Figure 2B:
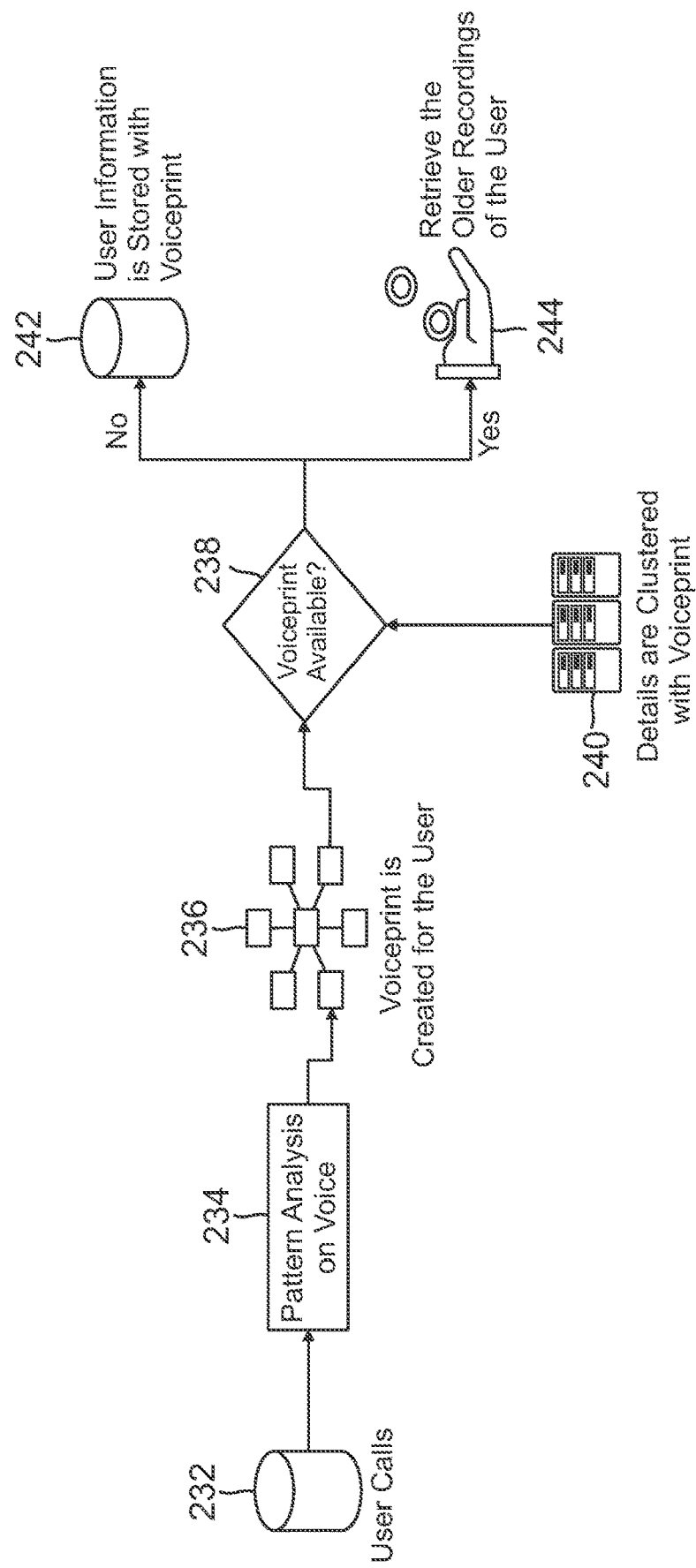
Figure 2C:
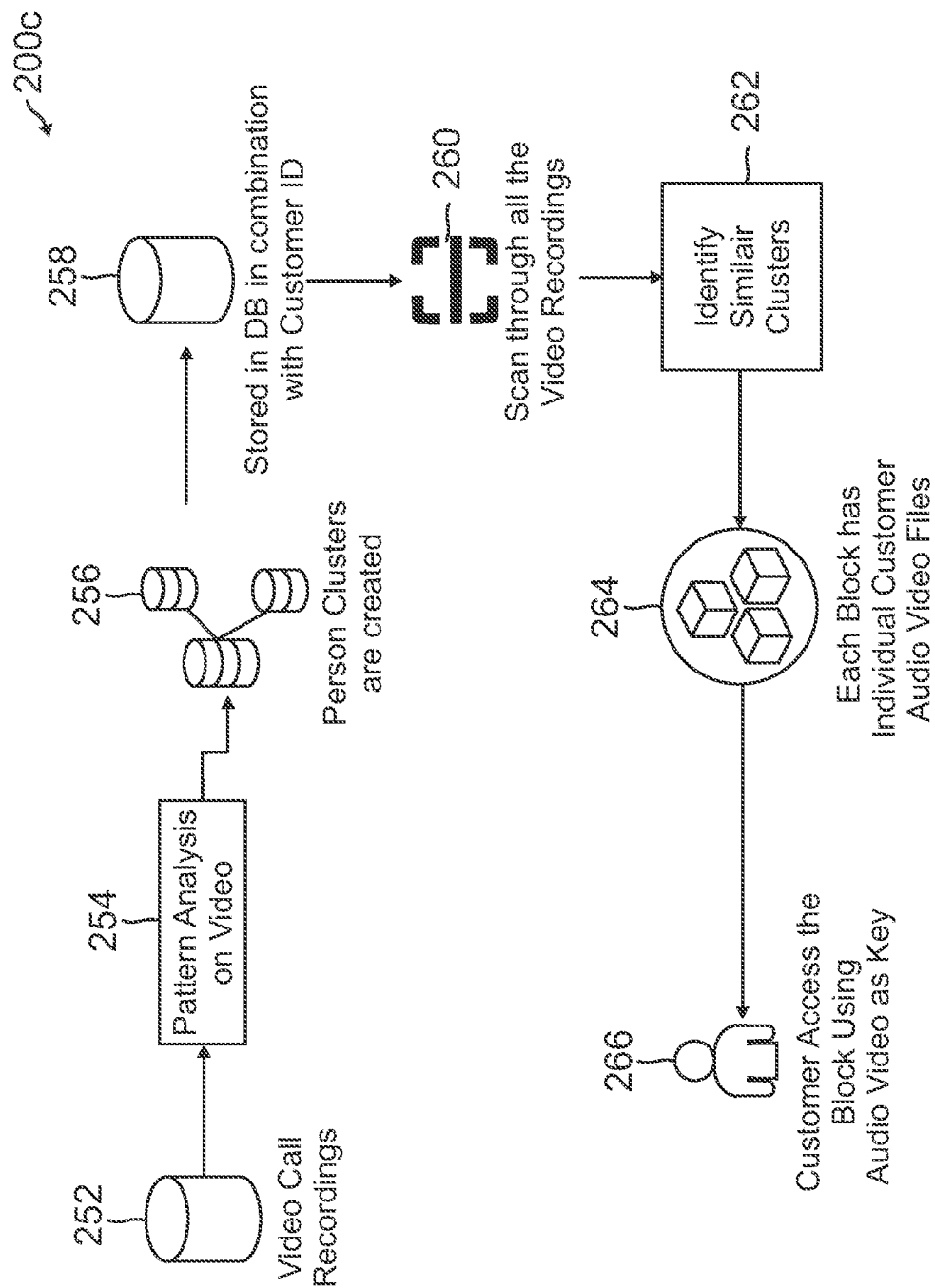

FIGS. 2A-2C are exemplary system architectures 200a-200c of service provider components used to generate voice prints and perform procedural pattern matching in audio and audiovisual files using such voice prints, according to an embodiment. System architectures 200a-200c show interactions between devices and components for voice print generation, such as by voice printing application 130 when voice communications are provided or performed with service provider server 120 (e.g., using service applications 122) discussed in reference to system 100 of FIG. 1. In this regard, a user may interact with the service provider components for voice print generation and usage, such as through voice application 112 discussed in reference to system 100.

In system architecture 200a, interactions are shown between system components when passively creating voice prints from stored recordings and other audio or audiovisual data, such as during batch processing. For example, in large enterprise data systems, cloud storage and data processing environments, and distributed database storages, semi-structured and unstructured data may be difficult to narrow down as there may be no clear groupings of data. Further, a customer's or other user's voice that interacts with a service provider may be termed personal or private data (e.g., such as PII, which may be governed or controlled based on rules, regulations, laws, or company requirements), which may be difficult to identify and further mask. Media files with such data, such as audio (e.g., phone calls, voice chat sessions, etc.) and/or audiovisual data (e.g., video chats and/or conferences, etc.), may take up a large amount of storage and be stored in segments, which may not be grouped based on voice and thus a customer's audio and/or audiovisual files may not be stored for the single customer in a common storage pool. Thus, when the customer or other user calls customer service, interacts to use a computing service, or otherwise communicates with the service provider, it may take a significant amount of time to trace the customer's history as there may be no linking between data needed by service agents to properly or efficiently address the customer's needs.

Instead, in system architecture 200a, a service provider's computing system may generate voice prints in a passive manner from stored data to reduce, alleviate, or solve these issues in computing systems and data storage. In this regard, voice prints may be generated from dimensions of a user's voice (e.g., voice volume, cadence, speed of words, tone, etc.), as well as additional information from video calls (e.g., photograph of the user, background image, eye movements, gestures, etc.) and used for pattern matching by detecting the same or similar dimensions in other data. Such dimensions may be determined from features of audio signals, such as frequency, amplitude, active/inactive portions (e.g., silence or sound/voice), and the like. Such voice prints may be generated by capturing a voice of a user in an audio file, stream, or other content and calculating the voice print as shown in and described in relation to FIGS. 2A-3. However, voice print calculation may be done by calculating a mathematical representation of each voice dimension from the audio features of the signals, such as by extracting the signals and generating averages, vectors, or other representations of the features of the signals and using a function or algorithm for voice print calculation.

In system architecture 200a, initially, call recordings 202 are accessed, which may correspond to audio and/or audiovisual files or other content for one or more users that are to have their voice prints calculated and determined. This may be done passively (e.g., in batch processing), without an active request, or may be done on request by an internal system user or external customer or another user. The passive pattern matcher for voice prints may include two components, a generator and an analyzer, where the voice print generator may identify an audio/audiovisual file and generate a voice print using the corresponding formula or algorithm. Pattern analysis 204 is performed next on call recordings 202, where the audio data having the voice is analyzed for audio features, such as a voice tone, emotion, word speed, pauses, decibel level, and/or background noise. A voice print 206 is then calculated or generated for the user, and each user in the audio data may have a corresponding voice print generated. Voice print 206 may be generated as a value or other representation as an output of the algorithm for voice print calculation so that the user's voice (e.g., personal data) is not revealed by the voice print. A voice print storage 208 may then store the voice print with user information for further usage.

Additionally, a voice print scan 210 may be performed to match the user's voice print to other stored voice prints from voice print storage 208 and/or mapped to additional data based on the voice print. Thus matches (e.g., within a threshold similarity score, value, or the like) may be grouped so that grouped recordings 212 are associated with each other in a database using voice print 206, including voice print storage 208 or other media data and/or audio/audiovisual file storage database. As such, the data may be converted to structured or semi-structured grouped data allowing for faster and more efficient searching and retrieval using voice print 206. Clustered details 214 for the audio and/or audiovisual files with corresponding voice prints are provided in a data warehouse, storage lake, or the like and the voice prints for data (e.g., voice print 206) may be used as the key for data retrieval. In addition to data retrieval, the voice prints may be retrieved and updated as corresponding voice data for the users is received over time. For example, as a user's voice changes over time, their corresponding voice print (e.g., voice print 206) may also change, which may be calculated from new voice data. As such, the voice print may be replaced or updated (e.g., by averaging, weighting toward more recent prints, combining, etc.) so that a user's voice print may be updated. When retrieving voice prints, a degree of tolerance, threshold difference or similarity score, or the like may be used for voice print retrieval and use as a data storage key.

Subsequently, a user 216 corresponding to one of the calculated voice prints may call into or otherwise contact and communication with the service provider, for example, using an audio or video communication channel. User 216 may provide their voice, where a voice print may be actively calculated (as discussed further with regard to FIG. 2B), and then matched using voice print storage 208, such as to voice print 206. This may invoke a voice analyzed to compare the voice print to already stored voice prints for audio and/or audiovisual file mapping and retrieval. User 216 may also provide other details as part of a data access request, which allows for data retrieval. Once the data is retrieved by voice print matching and pattern analysis, the user may request file modification 218, such as by deleting, scrubbing, or otherwise masking the user's voice (e.g., obfuscating from output to make the voice indecipherable or modulated). A masking operation 220 may mask the user's voice, such as by deleting, modulating, or changing the audio signals correspond to the user's voice from the audio/audiovisual files having the user's voice. Thus, a remaining audio file may contain other data with the user's voice removed or masked to prevent revealing personal or private information of the user.

In system architecture 200*b* of FIG. 2B, interactions are shown between system components when actively creating voice prints during a customer or other user call, such as to a help or assistance channel, service channel (e.g., for electronic transaction processing), or the like. For example, a user 232 may call into a service hotline or communication channel, initiate a video or voice chat with a service agent, call a merchant or transaction processing for payment services, or the like. For active pattern matching, three components may be used, such as a generator, analyzer, and extractor. Pattern analysis 234, similar to pattern analysis 204, on a voice of user 232 (e.g., in a voice recording file, audio or video stream, or the like) may be performed by the voice print generator in order to calculate voice print 236. Pattern analysis 234 may utilize similar dimensions, such as voice tone, emotion, word speed, pauses, decibel level, and/or background noise.

Voice print 236 may then be compared and matched to available voice prints 238, which may be retrieved from voice print clusters 240 in a database by the voice print analyzed. Voice print clusters 240 may include voice prints as data keys with associated stored data, including audio and/or audiovisual data and files from past communication sessions. If available voice prints 238 do not return a match, a voice print storage 242 may be used to store the newly calculated voice print with the corresponding data, such as an audio or audiovisual recording of the interaction by user 232 with the system. However, if available voice prints 238 return a match, data retrieval 244 may be performed to retrieve older or past call recordings and data for additional details. This may allow for recordings of a single user to be stitched together to obtain a full or complete chat and/or conversation history of the user and better understand the user's problem, issue, or request in communicating with the service provider. Stitching of the files and other audio data together may include linking, such as by voice print, by timestamp, initiation series, and the like, to form a sequential or other ordered history of the user's contacts with the service provider.

Further, a match may be used to perform additional operations. For example, the user may be authenticated for transaction processing, account access and/or usage, and/or other service usages with the service provider. The authentication may include login to an account, user identification and verification, and the like. Such operations for use of voice print 236 may be performed in real-time or near real-time between different devices and servers, and thus, user details, including, but not limited to, an email address, a phone number, a name, an address, personally identifiable information (PII), know your customer (KYC) information, tax or government identifiers, and/or the like may be retrieved, used for authentication, and/or masked so that such details are not revealed in other communications and/or data storage actions.

In system architecture 200*c* of FIG. 2C, interactions are shown between system components when performing video pattern identification and matching using voice prints from video or other audiovisual data with corresponding video and/or images. For example, voice prints may further be used with data from video calls and conferences to provide further uniqueness and robustness to voice print identification and verification of users, as well as data storage using voice prints as keys. In this regard, video call recordings 252 are accessed by a voice print generator for video recordings, and a pattern analysis 254 may be performed. Pattern analysis 254 may further include additional information with a voice print, such as a person's picture or image, eye movements, gestures, gender, background images or scenery, and the like. The resulting voice print further includes data processed from the images and/or video of a user and allows for person clusters 256 to be created for the audio and/or audiovisual data of the different users.

Person clusters 256 may then be stored in a database 258 in association with a customer identifier. Further, person clusters 256 from database 258 may be used to scan through additional video recordings 260 and identify further recordings of the user in different stored videos, as well as audio data using the voice print alone of the user (e.g., without the additional image or video data of the user). Similar clusters 262 may then be identified based on the scanning through additional video recordings 260, such that audio/video blocks 264 may be generated for each user as a key for corresponding data. Audio/video blocks 264 may therefore have the clustered and affiliated audio and/or audiovisual data of the user using audio/video blocks 264 as the data retrieval key from database 258 or other storage. Thus, users may then access audio/video blocks 264 and corresponding data using such blocks as their key for data retrieval and/or additional operations.

Figure 3:
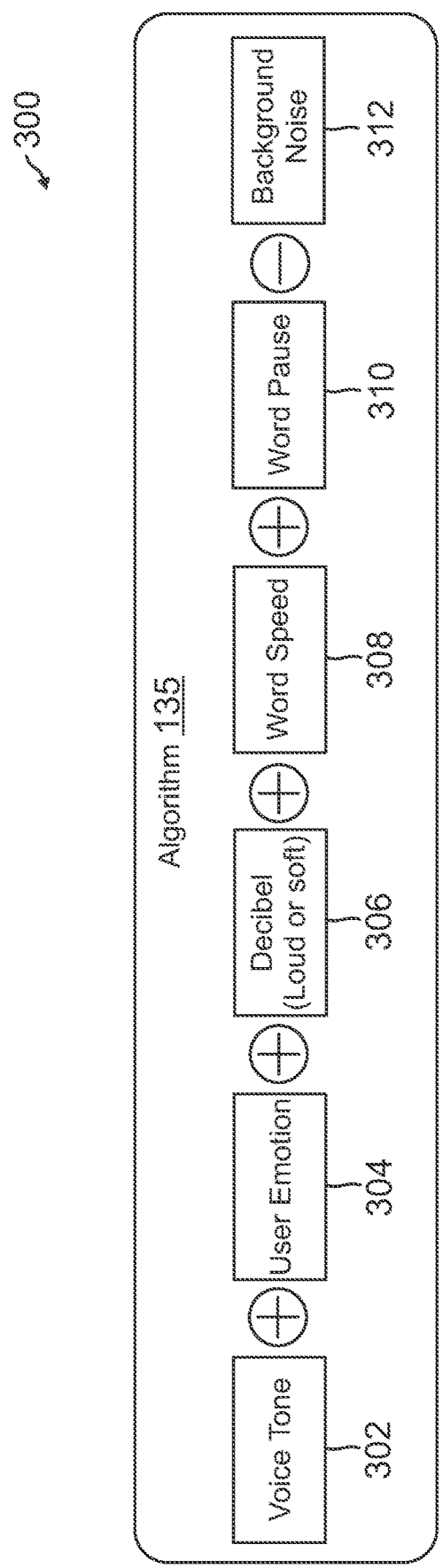
FIG. 3 is an exemplary diagram of a formula to generate a voice print for procedural pattern matching in audio and audiovisual files, according to an embodiment.

FIG. 3 is an exemplary diagram 300 of a formula to generate a voice print for procedural pattern matching in audio and audiovisual files, according to an embodiment. Diagram 300 includes components for algorithm 135 of voice print generator 134 when executed by voice printing application 130 discussed in reference to system 100 of FIG. 1, such as for voice print generation. In this regard, the audio features and corresponding voice or audio dimensions may be used for voice print generation and usage, such as through voice application 112 discussed in reference to system 100.

In diagram 300, the audio feature components of a user's voice for the different voice and/or audio dimensions in audio data that are used by algorithm 135 are shown. Algorithm 135 may utilize such features to calculate, generate, convert data to and/or otherwise determine voice prints. For example, audio features may be extracted from corresponding signals in audio data, which may be isolated, clustered based on correspondence, and/or processed (e.g., converted to an average, vector representation, or other data that allows for identification of a voice without storage of the audio signals of that voice). An audio or audiovisual (e.g., a video, video chat or conference session, etc.) data file, stream, or other content may be processed to determine the audio signals and identify those belonging to a user, such as by using an audio or voice identification system. Such a system may implement one or more ML models or other AI systems (including rule-based engines or NNs).

A coder, tester, data scientist, administrator, or other end user may configure algorithm 135 and specifically the audio features used for voice print determination. As such, the audio features shown in diagram 300 may be changed, such as by adding, deleting, and/or replacing certain features based on desired voice or audio dimensions for voice print determination. Algorithm 135 may be specifically tailored for the desired audio features. In diagram 300, algorithm 135 includes audio features for a voice tone 302, a user emotion 304, a decibel level 306, a word speed 308, and a word pause 310, which are included in the voice print, and a further audio feature for background noise 312 that is removed from the being included in the voice print. In this regard, voice tone 302, user emotion 304, and decibel level 306 may correspond to the audio signals, in frequency and/or amplitude, of the user's voice as the user speaks, while word speed 308 and/or word pause 310 may correspond to cadence, voice patterns or speech mannerisms, and the like. However, other measures may also be used to measure, identify, and/or calculate the data for the audio features used for algorithm 135. Background noise 312 may further be filtered or removed using background noise filters. The data for each of these features may be determined by analyzing the corresponding audio signals from the audio or audiovisual data. Thereafter, algorithm 135 may weigh, factor, or otherwise adjust a value or contribution of each feature to the voice print, and a score, vector, or other representation may be output based on such value adjustments and contributions.

Figure 4:
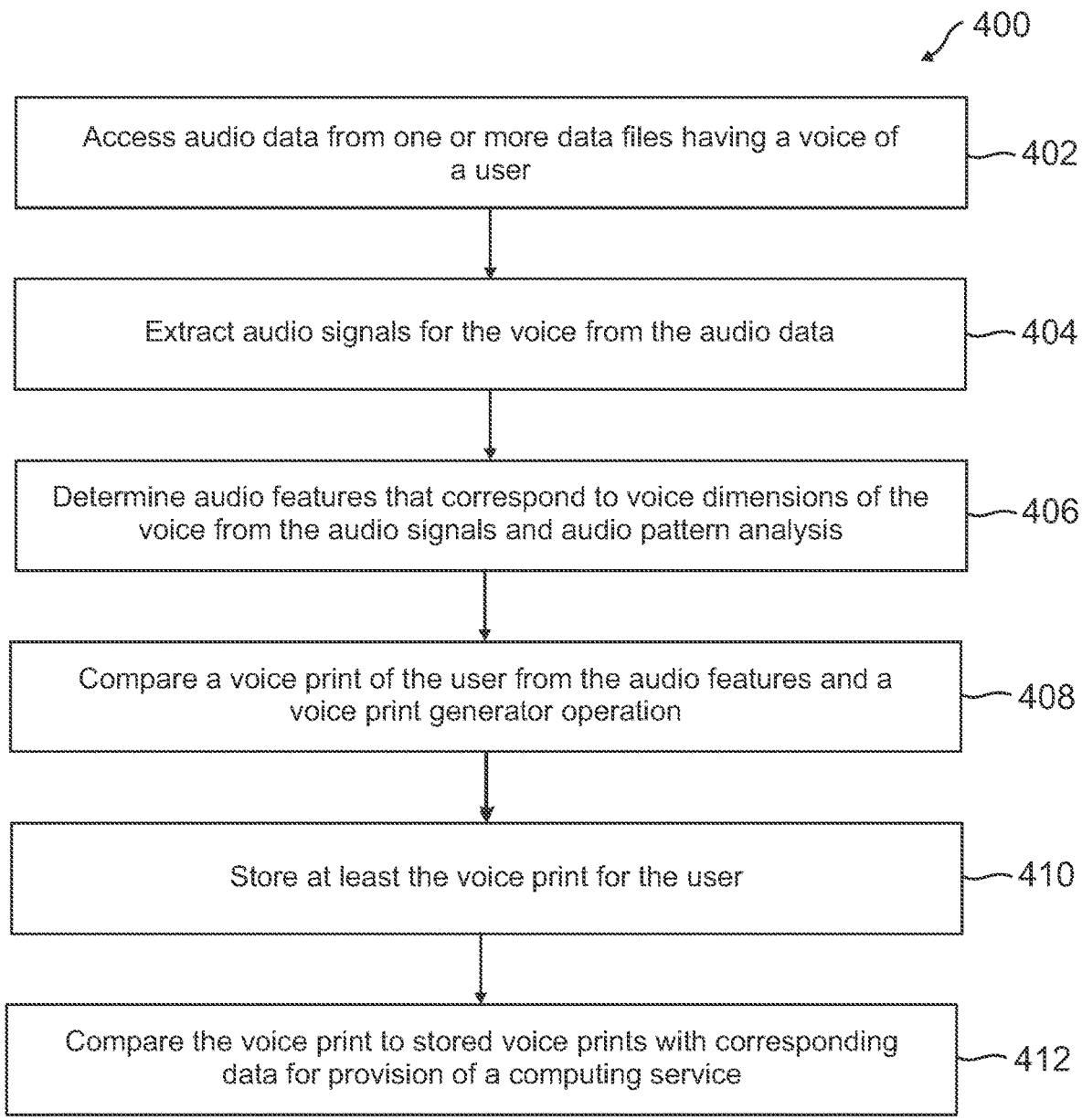
FIG. 4 is a flowchart for procedural pattern matching in audio and audiovisual files using voice prints, according to an embodiment.

FIG. 4 is a flowchart 400 for procedural pattern matching in audio and audiovisual files using voice prints, according to an embodiment. Note that one or more steps, processes, and methods described herein of flowchart 400 may be omitted, performed in a different sequence, or combined as desired or appropriate.

At step 402 of flowchart 400, audio data from one or more data files having a voice of a user is accessed. Audio data may be accessed from audio and/or audiovisual files that may be generated from voice communication sessions by users with endpoints associated with a service provider, such as by calling into a call center or other CRM channel, using an IVR system for assistance, engaging in a video chat or conference, or the like. In further embodiments, audio data may be streamed and accessed from a data stream, or content having audio data with a voice of at least one user may be obtained. At step 404, audio signals are extracted for the voice from the audio data. The audio signals may be extracted by identifying, isolating, and processing such signals, and further grouping similar or matching signals based on user and/or likelihood that such signals correspond to the same user.

At step 406, audio features that correspond to voice dimensions of the voice are determined from the audio signals and audio pattern analysis. The voice dimensions may correspond to different cadences, pronunciations, dialects, inflections, volumes, pitches or frequency (as a sound wave oscillation per unit of time, such as a hertz), silent and speaking portions, patterns, and the like. As such, the audio features may correspond to different features, such as tone, emotion, decibel level, word speed, word pauses, and the like of the audio signals corresponding to a user's voice and may allow for identification of the different users. At step 408, a voice print of the user is computed from the audio features and a voice print generator operation. An algorithm or other function may be implemented in an automated voice print generation system to calculate a voice print from the audio features. This may be done through mathematical calculations and by converting the audio signals to other data that does not include the voice recording of the user to protect user privacy. The voice print may then uniquely identify a user without providing underlying voice data of the user, which may be considered private, PII, or the like.

At step 410, at least the voice print is stored for the user. When storing the voice print, other personal data of the user may be scrubbed, removed, or obfuscated, such as the user's voice in the audio data, in order to protect the privacy of the user. In addition, other data may be stored in association with the voice print, such as voice communication session recordings and data, customer journey data, transaction processing data, authentication data, and the like. At step 412, the voice print is compared to stored voice prints with corresponding data for provision of computing services. In this regard, when the user further connects to the service provider or other system having access to the voice print and stored data associated with the voice print, the user may provide a voice sample, recording, or other audio data (e.g., in a file or stream) of the user's voice. The data may be used to generate a voice print and perform matching to other stored voice print for data retrieval. The data retrieval may be done without storing the user's voice, such as by scrubbing the audio or audiovisual files of the user's voice, so that data retrieval may be privacy protected and more secure. The user's voice and voice print may also be used for user authentication, such as an account login or authentication, identification of the user, and/or provision of a computing service to the user (e.g., electronic transaction processing, such as by processing a payment or providing services associated with processing a payment including dispute resolution, fraud, etc.).

Figure 5:
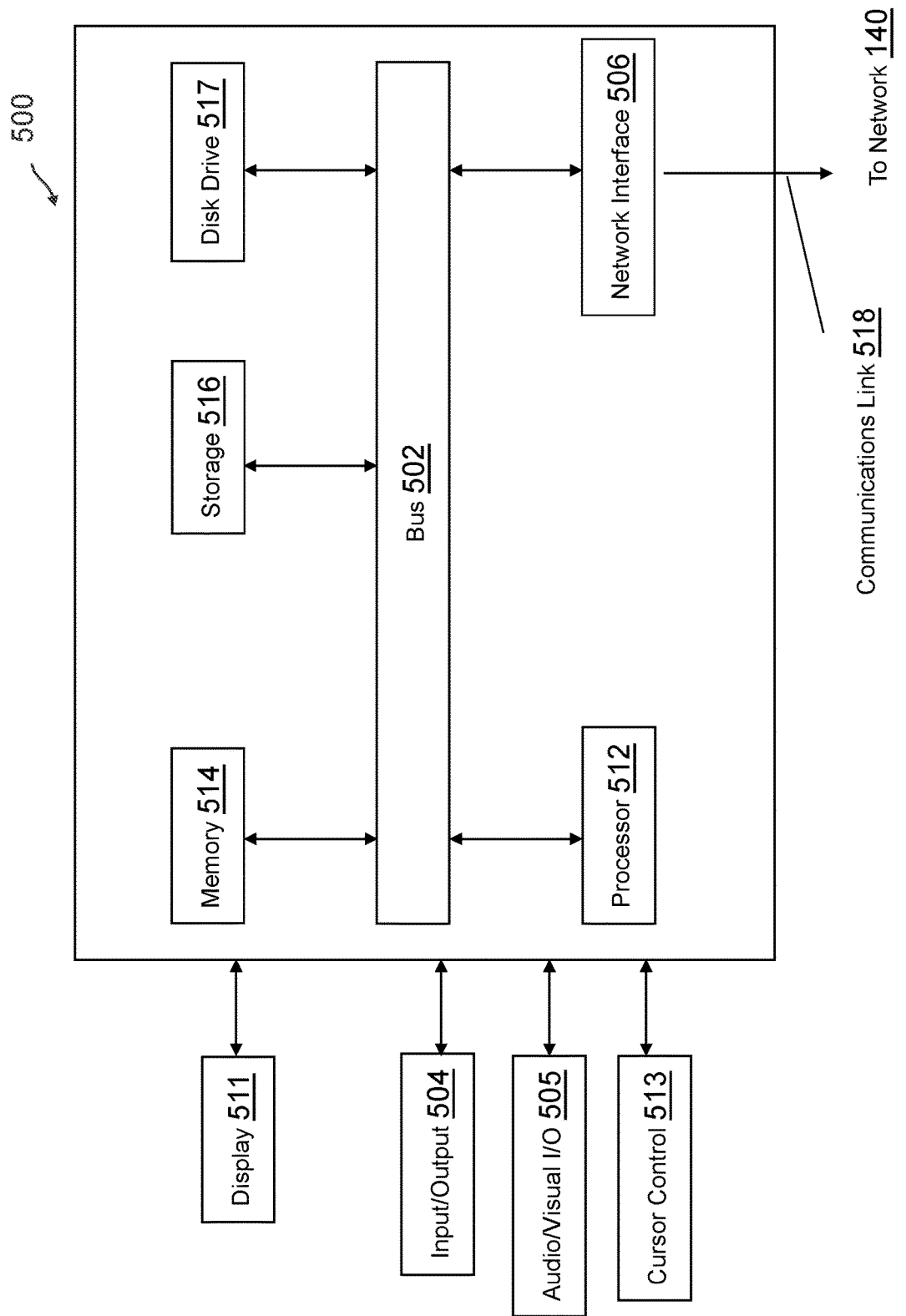
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517.

Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
      receiving an audio data file comprising recorded audio data of at least a voice of a user during a communication session with a data endpoint corresponding to the service provider system;
      extracting, from the recorded audio data, an audio signal corresponding to the voice of the user;
      identifying a plurality of audio features of the voice of the user based on the extracted audio signal, wherein each of the plurality of audio features is associated with a different audio dimension of the voice;
      computing a voice print of the user based on the plurality of audio features, wherein the voice print comprises a combined value representing the different audio dimensions;
      storing the voice print in association with an identifier for the user; and
      modifying the audio data file by at least one of:
         scrubbing the voice of the user independent of affecting an additional audio signal in the recorded audio data of another voice of a different user; or
         deleting the audio signal for the voice of the user independent of the additional audio signal of the another voice from the recorded audio data.

2. The service provider system of claim 1, wherein the operations further comprise:
   deleting user contact information for the user from the audio data file.

3. The service provider system of claim 1, wherein the computing the voice print comprises calculating a mathematical representation of a sound wave for each of the plurality of audio features.

4. The service provider system of claim 1, wherein the operations further comprise:
   receiving additional recorded audio data;
   determining the voice print of the user present in the additional recorded audio data; and
   comparing the voice print and the additional recorded audio data to at least audio data in the audio data file.

5. The service provider system of claim 4, wherein the storing the voice print further comprises storing at least one of the audio data file or user interaction data from the communication session in association with the identifier for the user, and wherein the operations further comprise:
   based on the comparing, retrieving the at least one of the audio data file or the user interaction data.

6. The service provider system of claim 4, wherein the operations further comprise:
   based on the comparing, authenticating the user for a computing service provided by the service provider system in association with the additional recorded audio data.

7. The service provider system of claim 1, wherein the voice print is computed that prevents storage of at least one of personally identifiable information or personal data including the voice of the user, and wherein the voice print is further computed as a data representation of the audio signal independent of storage of the audio signal with the audio data file.

8. The service provider system of claim 1, wherein the operations further comprise:
  accessing additional data associated with the user, wherein the additional data is further associated with the voice print; and
  combining the audio data file with the additional data for a user history associated with the user, wherein the user history is identifiable using the voice print.

9. The service provider system of claim 1, wherein the audio data file corresponds to a video data file including the recorded audio data, and wherein the computing the voice print is further based on a user image representation of a user image of the user in the video data file.

10. The service provider system of claim 1, wherein prior to the storing the voice print, the operations further comprise:
  determining an account associated with the user, wherein the identifier comprises an account identifier and the voice print is stored in association with the account.

11. The service provider system of claim 1, wherein the audio dimension comprises a voice tone, a voice volume, a voice frequency, a cadence, a user emotion, a word speed, a pause between words, or a pronunciation.

12. A method comprising:
  obtaining, by a voice print generator of a service provider system, a recording of an audio communication session between a user and an agent associated with the service provider system;
  determining, by the voice print generator, a plurality of audio features from one or more audio signals in the recording, wherein the plurality of audio features are associated with one or more noise dimensions detected during the audio communication session;
  calculating, by the voice print generator, a voice print of the user based on the plurality of audio features;
  determining an account of the user with the service provider system;
  storing the voice print in association with the account; and
  removing, from the recording after the voice print of the user has been calculated, portions of the one or more audio signals corresponding to a voice of the user.

13. The method of claim 12, wherein, prior to the determining the account, the method further comprises:
  determining one of a device identifier for a computing device used by the user for the audio communication session or an account identifier provided during the audio communication session, wherein the one of the device identifier or the account identifier is provided during the audio communication session that enables retrieval of past communication sessions by the user with the service provider system.

14. The method of claim 13, wherein the device identifier comprises a phone number of the computing device, a name associated with the phone number, or a unique identifier associated with a unique telephony number standard.

15. The method of claim 13, wherein the account comprises a payment account usable with one or more electronic transaction processing services of the service provider system, and wherein the method further comprises:
  determining the past communication sessions using the voice print; and
  providing the past communication sessions during the audio communication session or in a transaction processing application.

16. The method of claim 12, further comprising:
  authenticating the user for the account using the voice print and a stored past voice print accessible by the service provider system; and
  providing access to a transaction processing service after the account is authenticated during the audio communication session.

17. The method of claim 12, wherein prior to the obtaining the recording, the method further comprises:
  receiving, by the voice print generator, a registration request of the user for the voice print, wherein the registration request identifies the account and the audio communication session,
  wherein the storing the voice print includes registering the voice print and the account with a voice print analyzer based on the registration request.

18. A non-transitory machine-readable medium having stored thereon machine-readable instructions executable to cause a machine to perform operations comprising:
  receiving audio data comprising a voice of a user during an active communication session between the user and an endpoint associated with a service of a service provider;
  determining an audio signal corresponding to the voice of the user from the audio data;
  analyzing the audio signal for a plurality of audio features that correspond to voice dimensions of the voice during the active communication session;
  determining a voice print based on the plurality of audio features;
  comparing the voice print to a plurality of stored voice prints;
  determining a matching voice print previously stored by the service provider with corresponding data based on the comparing;
  outputting, to at least one device corresponding to at least one of the user or the endpoint, the corresponding data for the matching voice print during the active communication session;
  scrubbing at least a portion of the audio data of the voice of the user; and
  storing the voice print with the scrubbed audio data, wherein the storing is performed without storing the audio signal corresponding to the voice of the user.

19. The non-transitory machine-readable medium of claim 18, wherein the corresponding data comprises one or more past audio communications performed by the user with one or more live endpoints or automated endpoints of the service provider.

20. The non-transitory machine-readable medium of claim 18, wherein the operations further comprise:
  authenticating the user for one of the outputting or a use of the service based on the matching voice print and an authentication requirement.

* * * * *